US005214750A

United States Patent [19]

Minowa et al.

[11] Patent Number: 5,214,750

[45] Date of Patent: May 25, 1993

[54] PRINTER AND METHOD FOR CONTROLLING THE SAME

[75] Inventors: Masahiro Minowa; Yoshikazu Ito, both of Nagano, Japan

[73] Assignee: Seiko Epson Corporation, Tokyo, Japan

[21] Appl. No.: 791,286

[22] Filed: Nov. 13, 1991

[30] Foreign Application Priority Data

Nov. 14, 1990 [JP] Japan .................................. 2-307861
Sep. 27, 1991 [JP] Japan .................................. 3-249178

[51] Int. Cl.$^5$ .............................................. G01D 15/00
[52] U.S. Cl. ..................................... 395/111; 400/605
[58] Field of Search ............... 395/101, 111, 112, 115; 271/9; 400/56, 605, 629; 346/134, 136

[56] References Cited

U.S. PATENT DOCUMENTS 4,475,731 10/1984 Wood .................................. 400/629
4,615,630 10/1986 Maeshima ........................... 400/596
4,847,633 7/1989 Piatt et al. ........................... 400/605
5,061,095 10/1991 Asai et al. ........................... 400/605

FOREIGN PATENT DOCUMENTS 0428163 5/1991 European Pat. Off. ............ 395/111
3211843 10/1983 Fed. Rep. of Germany ...... 395/111

*Primary Examiner*—Arthur G. Evans
*Attorney, Agent, or Firm*—Sughrue, Mion, Zinn Macpeak & Seas

[57] ABSTRACT

A printer including a mechanism part which permits selective printing on cut sheets of record paper and rolled sheet of record paper, in which the designation of the record paper can be set from a host computer and, if two or more kinds of record paper are designated at the same time, the respective kinds of record paper are can be transferred simultaneously to thereby be able to print the printed contents of the cut sheet paper on the continuous paper as well. Whereby, the printer which can accommodate various kinds of record paper, is simple in structure and highly reliable, includes an inexpensive printing mechanism which provides a good space efficiency, can selectively print cut sheets and continuous paper with a high efficiency, and can print the printed contents of the cut sheet paper on the roll paper at the same time, and a method for controlling the printer.

4 Claims, 11 Drawing Sheets

φ =NO RECORD PAPER DESIGNATION OR REMOVAL
1 =RECORD PAPER DESIGNATION

PRINTER AND METHOD FOR CONTROLLING THE SAME

BACKGROUND OF THE INVENTION

The present invention relates to a printer and, in particular, to a structure of a printer suited for POS-/ECR applications and a method of controlling the same.

Conventional printers for printing on slips, which is one type of cut sheet, must generally have a flat recording sheet guide of large area because slips comes in various sizes and may contain many printing lines. Few such printers (generally called "slip printers") allow the use of a rolled sheet.

A validation sheet, which also is a type of cut sheet, is generally available in a regular size. However, validation sheets are multiple-layer sheets, that is, each validation sheet includes plural copying sheets behind the front or top sheet. Conventional printers dedicated to rolled sheet printing, on the other hand, have not been able to accommodate validation sheets along their recording sheet paths.

FIG. 13 shows a block diagram of a conventional record paper control system in which power is switchingly applied by a single drive source by switching the drive force using drive force switching means 501 between cut sheet printing and rolled sheet printing.

Recently, POS/ECR printers capable of handling various types of recording sheets used in POS markets have been called for.

However, in such integral printer, there are many technical problems hard to solve partly because the validation paper in general use consists of many sheets of paper to be copied; for example, some of the sheets may be torn or caught in a record paper passage when the passage is long, which gives rise to troubles.

Moreover, the conventional recording sheet forwarding paths, each driven by a separate drive source and a separate clutch, require an expensive and complicated control system involving a large number of parts. A single drive system employs a gear switching mechanism as the drive force switching means. However, to meet the latest demand not only for independent operation of both slip printing and rolled sheet printing but also for their simultaneous operation in which the slip printing content is simultaneously printed on a rolled sheet as a journal for security purposes (hereinafter referred to as "security slip"), the conventional printer does not provide the necessary functions.

SUMMARY OF THE INVENTION

An object of the invention therefore is to provide a simply constructed and highly reliable printer capable of printing various types of recording sheets with an integrated printing section, inexpensive and space-saving print mechanisms, and a means and method for optimally controlling the print mechanisms.

Another object of the invention is to provide a printer mechanism capable not only of efficiently switching between cut sheet printing and continuous sheet printing, but also of simultaneously printing a cut sheet printing content on a continuous sheet whenever necessary, and a method of controlling such a printer mechanism.

In order to achieve the above objects, according to the invention, a printer including a record paper passage capable of printing at least 2 kinds of record paper by means of a printing part having a printing head, which comprises:

- a record paper passage and record paper transfer means for transferring a cut sheet of paper;
- a record paper passages and record paper transfer means for transferring continuous sheets of paper;
- an interface for transmitting and receiving data codes for various kinds of information of said printer including a control command, printing data and the like to and from a host computer;
- data receiving means for receiving said data codes of said host computer;
- command analysis means for interpreting said control command of said host computer;
- memory means for storing the designation of the record paper type recognized by said command analysis means for every record paper; and,
- control means for controlling said transfer means according to the designation of the record paper stored.

Further, according to aspect of the invention, if the designation of the record paper represents a plurality of sheets of record paper, then at least two record paper transfer means are operated simultaneously to transfer the record paper.

Furthermore, according to another aspect of the invention, in the above-mentioned printer which, in addition to the above-mentioned structure, further includes a step motor serving as a common drive source for at least two record paper transfer means, clutch means interposed between the record paper transfer means and step motor and operable by an electric motor, count means for counting the number of drive steps of the step motor, and memory means for storing a given number of steps from the cut-off position of the record paper to a given position in the printing part, there is provided a method comprising the steps of: when the plurality of sheets of paper are designated,

- setting the clutch means in a non-connected state;
- detecting that the single sheet of paper is set at a given position;
- after detecting of the single sheet of paper, transferring the single sheet of paper to a given printing start position;
- after completion of the above step, connecting the clutch means;
- after connection of the clutch means, executing a given printing.

According to the above-mentioned structure of the invention, it is possible for the host computer to designate a selection as to which of a cut sheet of paper and continuous sheets of paper should be printed, and it is possible to drive the record paper transfer means that corresponds to the designated record paper. Also, when two kinds of record paper, that is, the cut sheets and continuous sheets are both designated from the host computer, the two kinds of record paper are both transferred and printed, thereby realizing selectively a function to leave the contents of the cut sheet in the continuous sheets.

Further, when printing the continuous sheets and cut sheet at the same time, setting of the cut sheet at the printing position is executed while the transfer of the continuous sheets is stopped. In general, in the simultaneous printing in the continuous sheets and cut sheet, carbonless duplicating paper is used as the continuous sheets.

DESCRIPTION OF THE PREFERRED EMBODIMENTS

Description will hereunder be given of an embodiment of a printer according to the invention with reference to the accompanying drawings.

Record paper used in the distribution industry is, in general, classified into a cut sheet of record paper and continuous sheets of record paper. The cut sheet of record paper includes paper of an unfixed size so called slip paper and paper having a relatively fixed size and a plurality of copying sheets so called validation paper. The continuous sheets of record paper includes journal paper to be kept as a shop's record and receipt paper to be used for issuing a receipt.

Figure 10A:
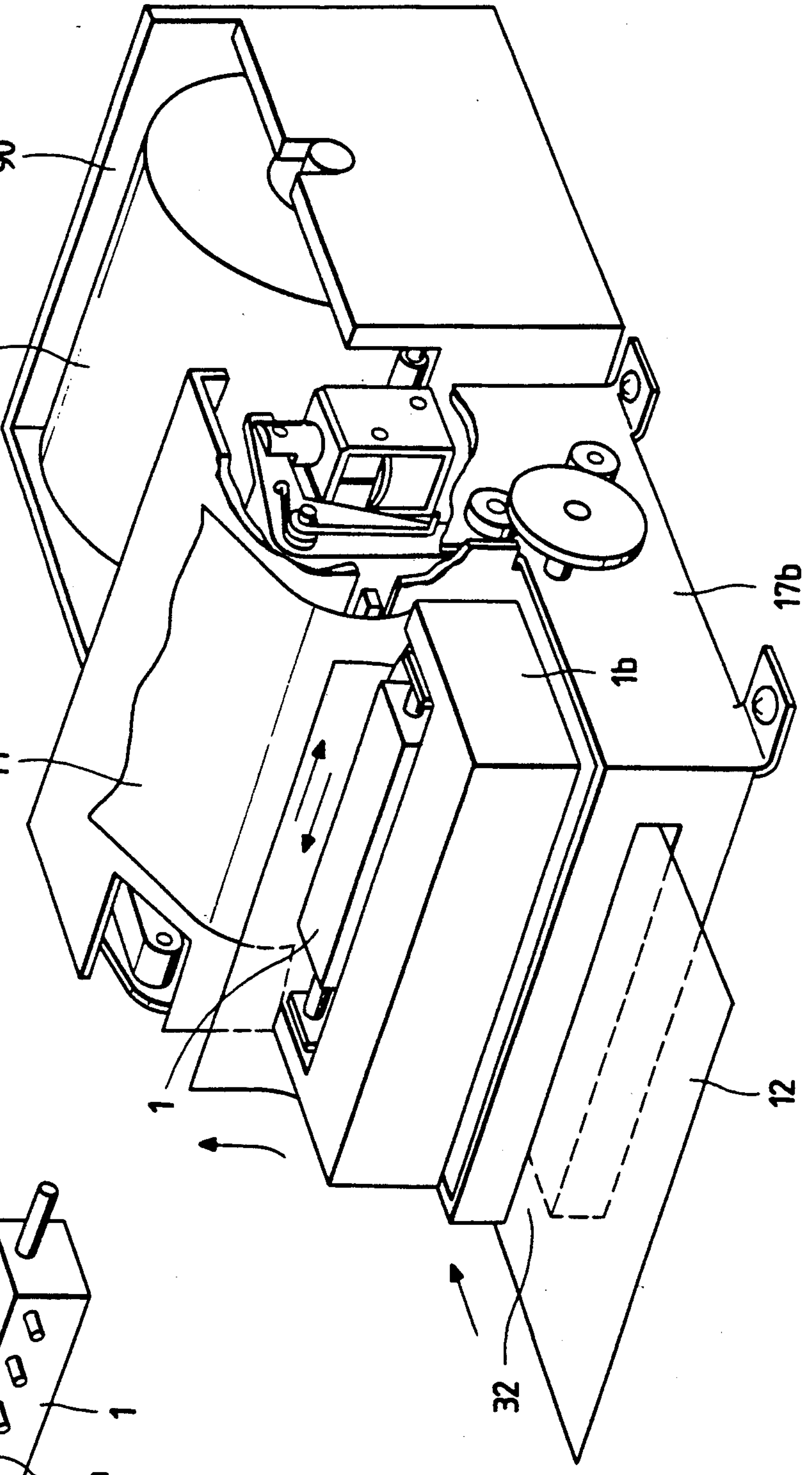
FIGS. 10A and 10B is a schematic view of the appearance of the printer mechanism part and the structure of an embodiment of a print head according to the invention.
Figure 10B:
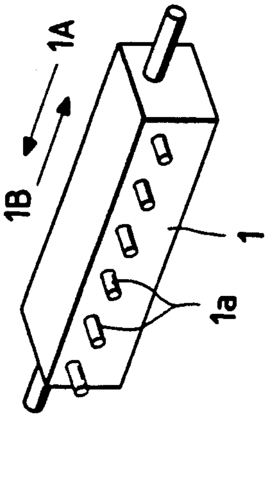

Referring now to FIGS. 10A and 10B, there is shown an explanatory view of the whole mechanisms part of a printer according to the invention, which is constructed to be able to accommodate various kinds of record paper.

In FIG. 10A, there is shown a general appearance view of the present printer, and in FIG. 10B there is shown a schematic view of an embodiment of a print head used in the mechanisms part of the present printer. In FIG. 10B, reference numeral 1 designates a main body of the print head and 1*a* stands for a plurality of wire pins for printing which are respectively used to form dots. The plurality of wire pins, as shown in this figure, are arranged in a line at a given interval from one another and can be reciprocated in directions of arrows 1A, 1B to print characters, symbols and the like.

The mechanisms part has the above-mentioned print head 1 therein and includes mechanisms which are able to shuttle the print head 1 right and left to thereby print three or more kinds of record paper, and description will be given below of the structure of the mechanisms part.

Now, FIGS. 7A to 8B are respectively schematic views of the structure of the mechanisms part of a printer according to the invention and the operations of the respective mechanisms according to the kinds of the record paper.

Figure 7A:
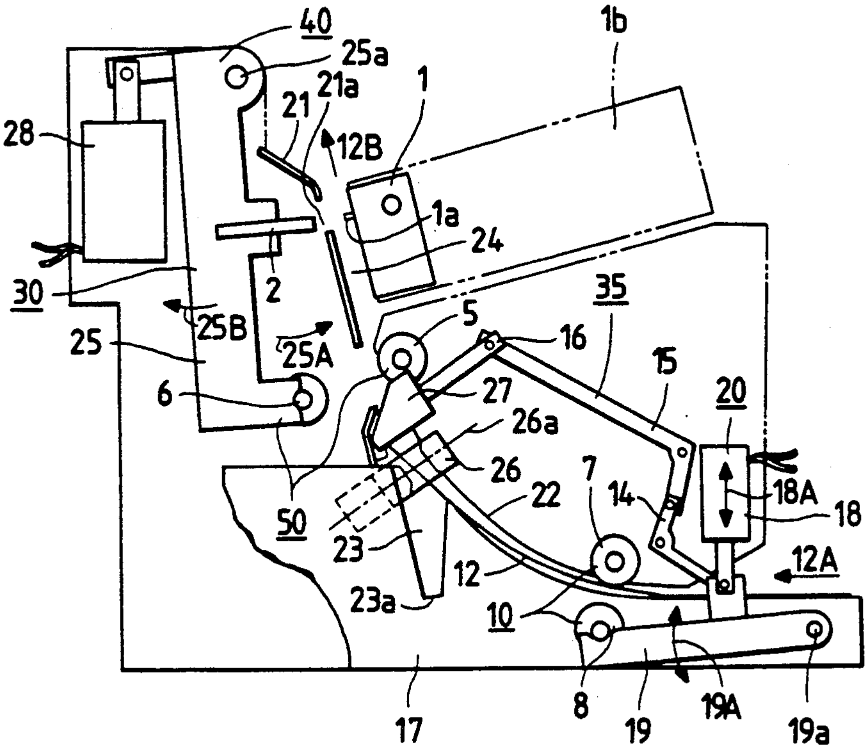
FIGS. 7A and 7B is a schematic view of the structure of the printer mechanism part and the operation of the respective mechanisms by the kinds of record paper according to the invention.
Figure 7B:
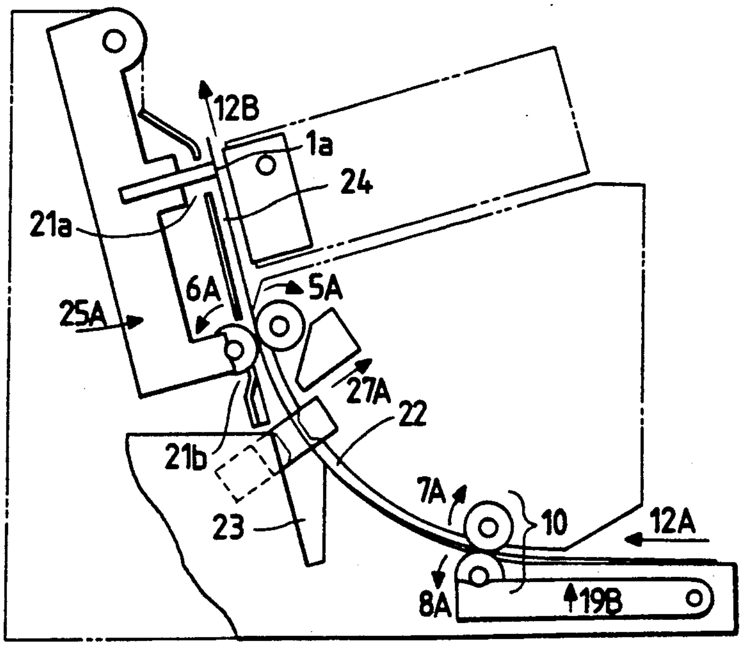

In particular, in FIGS. 7A and 7B, there is shown the operation of the present printer when the printer is used as a slip printer. Reference numeral 1 designates the print head on which the print wire pins or print elements 1*a* are disposed transversely in a line. Printing is executed by means of an ink ribbon (not shown) on the record paper disposed between the print head 1 and a platen 2 arranged opposed to the print head 1. The print head 1 employs, for example, a so called "shuttle printing device" which can be shuttled right and left by a motor (not shown). Reference numeral 1*b* designates a ribbon cassette which stores an ink ribbon therein.

Reference numeral 5 designates a record paper drive roller for transferring the record paper. The record paper drive roller 5 is connected through a transmission system such as gears or the like to a power source (not shown) such as a motor or the like. Reference numeral 6 designates a record paper hold roller disposed at the opposite position to the record paper drive roller 5 and is rotatably supported by an arm 25. Similarly, the platen 2 is also fixed to the arm 25. The arm 25 is arranged so as to be swingable in directions of arrows 25A and 25B around a supporting point 25*a* by a plunger 28. A printing part opening/closing mechanism 40 consists mainly of the platen 2, arm 25 and plunger 28. Also, a transfer part opening/closing mechanism 30 consists mainly of the record paper hold roller 6, arm 25 and plunger 28. Further a cut sheet transfer mechanism 50 consists mainly of the above-mentioned components and the record paper drive roller 5. The printing part opening/closing mechanism 40 is used to change a distance between the print head 1 of the printing part and the platen 2. The printing part opening/closing mechanism 40 and the transfer part opening/closing mechanism 30 share in common a drive source and the arm 25 that serves as a transmitting member.

Reference numeral 7 designates a record paper drive roller and 8 designates a record paper hold roller which is disposed at the opposite position to the record paper drive roller 7. The record paper hold roller 8 is supported by an arm 19 and is swingable in directions of arrows 19A around a supporting point 19*a* by a plunger 18. A record paper transfer mechanism 10 consists mainly of the record paper drive roller 7, record paper hold roller 8, arm 19 and plunger 18. Also, a transfer part opening/closing mechanism 20 consists mainly of the plunger 18, arm 19 and record paper hold roller 8. Reference 21 designates a record paper guide which forms a record paper transfer passage. The record paper guide 21 includes a notch portion 21*a* through which the platen 2 can extend, and a notch portion 21*b* through which the drive roller 6 can pass. Reference numeral 22 designates a record paper passage through which a slip, that is, a kind of the cut sheet of record paper, is guided, and the record paper passage 22 joins with a record paper passage 23 for validation paper, which will be discussed later, and is then connected to a record paper passage 24.

The operation of the plunger 18 (in directions of arrow 18A) is transmitted to a form stopper 27 that blocks the recording paper passages 22, 23 through cranks 14, 15 and a support member 16 which serves as a dead end stopper for positioning the recording sheet. A passage shut-off mechanism 35 consists mainly of these components.

Each of the plungers 18, 28, which serve as the power sources for the shuttle movements, is preferably constructed as plunger of a state memory type which incorporates a magnet therein. This is because such type of plunger does not consume power to hold the state thereof wastefully. In this case, as a drive circuit to drive the plungers, there is employed a bipolar type circuit which is able to flow currents in both directions.

A record paper detector 26 is an ordinary optical sensor of an opposed arrangement type having an optical axis 26*a*, which is able to detect the presence or absence of the record paper in accordance with the fact that the optical axis 26*a* is shut off or not.

The record paper 12 such as the slip or the like is guided through the record paper passage extending along arrows 12A and 12B when it is printed. When the record paper 12 is set, the record paper 12 is positioned based on a form stopper 27 and the presence or absence of the record paper 12 can be detected by the record paper detector 26. After completion of setting of the record paper 12, the plunger 18 is operated to move the arm 19 in a direction of an arrow 19B to thereby close the record paper transfer part, and at the same time the form stopper 27 is operated in a direction of an arrow 27A to release it from the record paper passage to thereby enable the record paper 12 to be transferred. In this operation, the printing part opening/closing mechanisms 40 is moved in a direction of an arrow 25A to be left in a closed state.

A stepper motor, as is usually used as a drive source of forwarding recording sheets, is arranged so that the transfer mechanisms 10 and 50 are connected to a single drive source so that they can be operated in synchronism with each other. As the motor (not shown) is rotated, the drive rollers 7 and 5 are rotated in directions of arrows 7A and 5A, respectively, while the slip sheet 12 is forwarded by being interposed between the drive rollers 7 and 5 and the hold rollers 8 and 6 confronting thereto. When starting the printing, the record paper 12 is at first sent a predetermined pitch to the printing part, and after the leading end of the record paper reaches a predetermined position in the upper end of the print part, the printing is started.

Figure 8A:
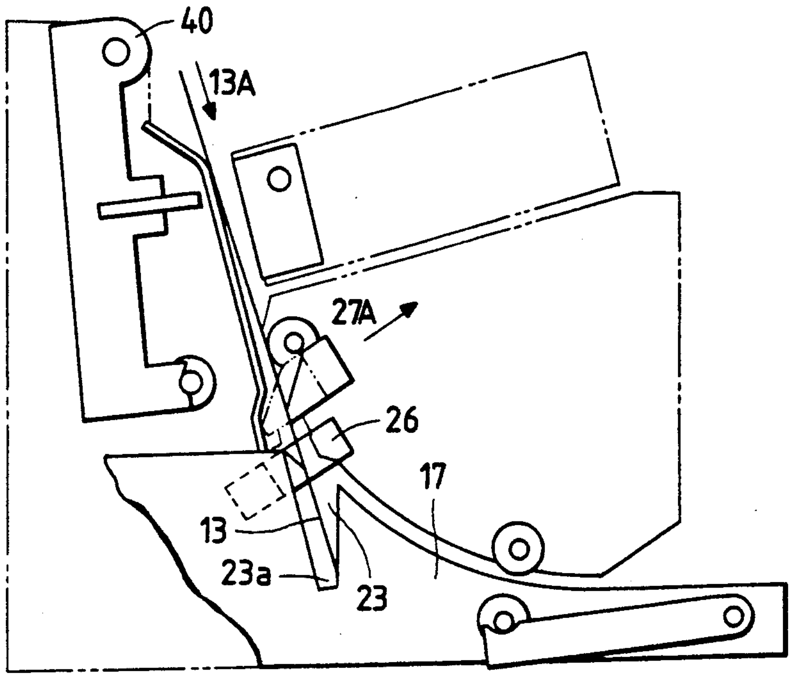
FIGS. 8A and 8B is a schematic view of the structure of the printer mechanism part and the operation of the respective mechanisms by the kinds of record paper according to the invention.
Figure 8B:
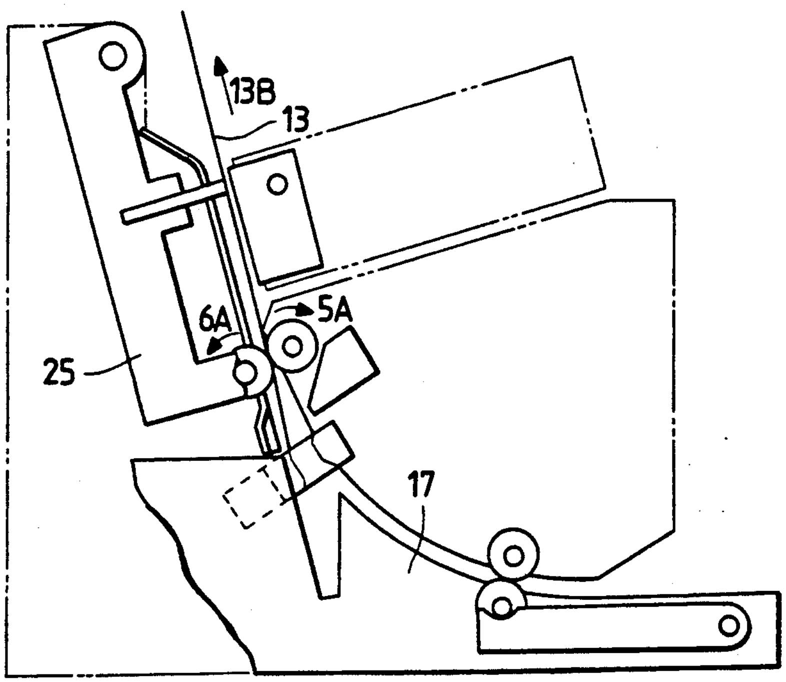

Referring now to FIGS. 8A and 8B, there is shown a schematic view to illustrate the operation of the printer of the invention when it is used as a validation printer. FIG. 8A shows the state of the printer at the time a validation sheet is being inserted, while FIG. 8B shows the state where the printer is in a printing operation. In these figures, the same parts as in FIG. 7 are given the same reference numerals and the description thereof is omitted here.

A validation sheet is a type of cut sheet whose size is fixed and which has a number of copying sheets attached thereto for validation purposes.

To use the printer as a validation sheet printer, a validation sheet 13 is inserted from the discharge side (or from the top of the printing section) for normal printing as indicated by arrow 13A. The printing part opening/closing mechanism 40 is opened to set the validation sheet 13. This provides a large clearance at the printing section, thereby allowing easy handling of the validation sheet, which is thick due to the attached copying sheets.

No long record paper passage need be prepared for ordinary validation sheets, the size of which is of the order of 3.5 inches. The record paper passage 23 formed by notching a side frame 17 of the printer guides the validation sheet 13 in a direction different from that of the slip sheet 12. The inserted validation sheet 13 is further guided down to arrive at the dead end stopper 23*a* to set its tail end. At this time, the form stopper 27, being arranged so as to be slidable along the support member 16, will be evacuated in a direction of arrow 27A by the force of the validation sheet 13, thereby not blocking the advance of the validation sheet 13.

A portion of the record paper passage between the printing section and the record paper detector 26 is shared in common by the slip sheet 12 and the validation sheet 13. The record paper detector 26, which is an ordinary optical sensor, is disposed at a position that allows detection of both the validation sheet 13 inserted as indicated by arrow 13A and the slip sheet 12 inserted as indicated by arrow 12A.

While the opposed type recording sheet detector 26 is used in this embodiment, a reflection type optical detector or a mechanical type detector may also be used for detection of both types of recording sheet.

Upon completion of setting the validation sheet 13, the platen 2 and the paper hold rollers 6 evacuated from the record paper passage are driven in the direction of arrow 25A by the plunger 28 in a manner similar to that for the slip sheet 12, with the validation sheet 13 being interposed between the drive rollers 5 and the hold rollers 6. Under this condition, the print head 1 starts printing while rotating the rollers 5 and 6 in directions of arrows 5A and 6A, respectively.

Since the validation sheet is of a fixed size, its print starting position is determined when it is set. Upon start of printing, the validation sheet 13 is forwarded in a direction of arrow 13B.

In both of the two kinds of record paper, the ends thereof can be detected when the record paper is transferred upwardly and passed through the record paper detector 26 and the ends thereof remove the shut-off of the optical axis 26*a* of the record paper detector 26. Since a printable range just after detection of the ends is equal to the remaining length of the record paper passage, this is calculated by a control device using a CPU and the like to detect a printing limit, thereby allowing printing in a predetermined range.

Referring now to FIG. 9, there is shown an explanatory view of an embodiment of the mechanism part of the printer according to the invention. This mechanism part includes an additional print mechanism for continuous sheet printing in the mechanism previously described with reference to FIGS. 7 and 8. In FIG. 9, the same functions and parts as in the previous embodiment are given the same designations.

Figure 9A:
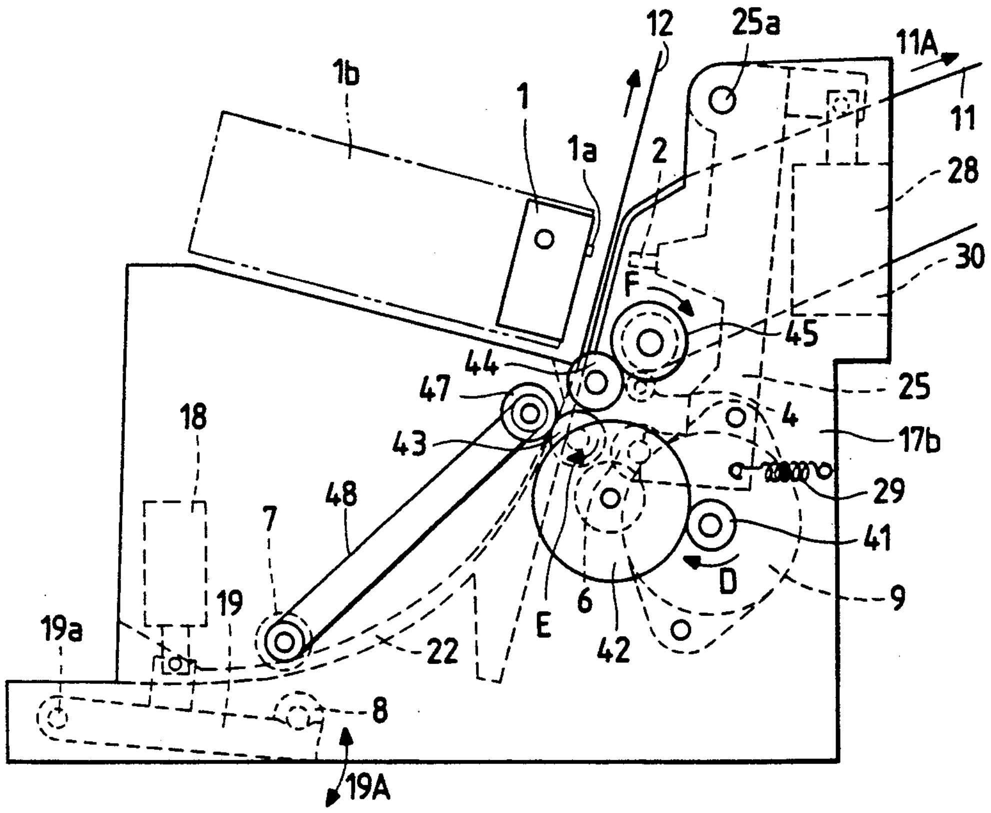
FIGS. 9A and 9B is a schematic view of the printing mechanism of the invention, illustrating connection between the respective record paper transfer mechanisms and a motor.
Figure 9B:
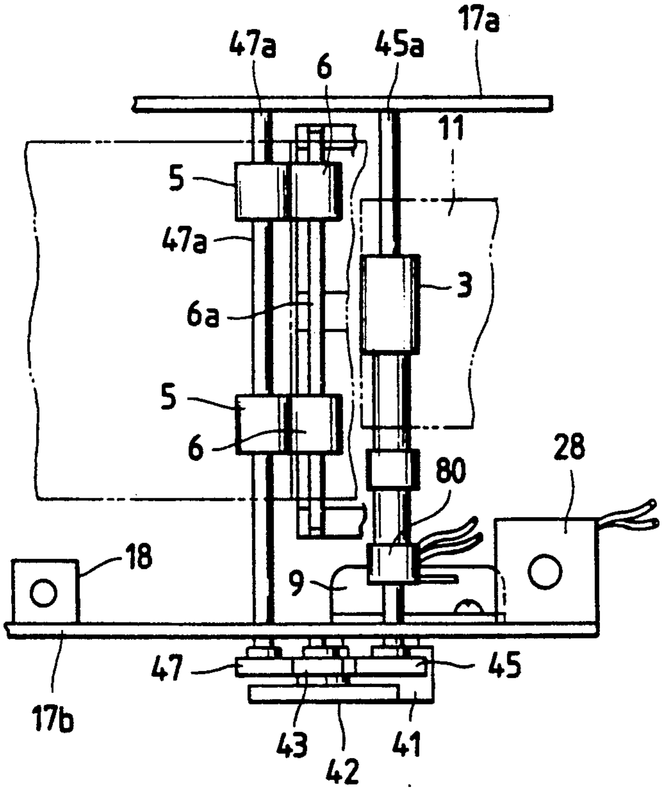

In particular, FIGS. 9A and 9B are respectively schematic views of the printing mechanism part constructed according to the present invention, illustrating the connection between the respective record paper transfer mechanisms and a motor.

A step motor 9, which serves as a paper feed power source, is mounted on the inside of a right side frame 17*b* and a motor gear 41, which is fixed to the motor shaft of the step motor 9, meshes with a gear train disposed on the outside of the side frame 17*b*. Intermediate gears 42, 43 and an intermediate gear 44 are rotatably supported by a shaft (not shown) fixed to the side frame 17*b*, respectively. A drive gear 45 is fixed to a drive gear shaft 45*a* which is rotatably supported by the right and left side frames 27*a* and 17*b*. A drive gear 47 and a drive roller 5 are fixed to a gear shaft 47*a*, respectively. In the present embodiment, there are shown two drive rollers 5 and two hold rollers 6. However, this is not limitative, but one drive roller 5 and one hold roller may be used, or three or more drive rollers 5 and three or more hold rollers can be used, according to the paper feed sizes, paper feed capabilities and other conditions. The step motor 9, intermediate gears 42, 43, drive gear 47, drive roller 5, hold roller and the like constitute a record paper transfer mechanism for the slip sheets.

Also, in the present embodiment, the intermediate gear 43 and drive gear 47 are connected with the motor 9 and the record paper drive roller 7 is connected with the drive gear 47 by means of a belt 48, whereby the slip sheet 12 is held by and between the hold roller 6 and drive roller 5 and is then transferred. The structures of the plunger 18, plunger 28 and the respective record paper transfer mechanisms are the same as in FIGS. 6 and 7 and the description thereof is omitted here. Reference numeral 29 designates a coil spring which assists the operation of the plunger 28. The coil spring 29 is disposed such that, when not energized electrically, it can hold the printing part in an open state.

The above-mentioned structures are basically the same with the those of the mechanisms shown in FIG. 7.

Next, description will be given below of a record paper transfer mechanism adapted for roll paper 11 which is one of the continuous paper.

Reference numeral 45 designates a drive gear which is connected with the intermediate gear 44 and is used to transfer and drive the roll paper 11, and clutch means is interposed between the drive gear 45 and the drive roller 3.

Figure 11:
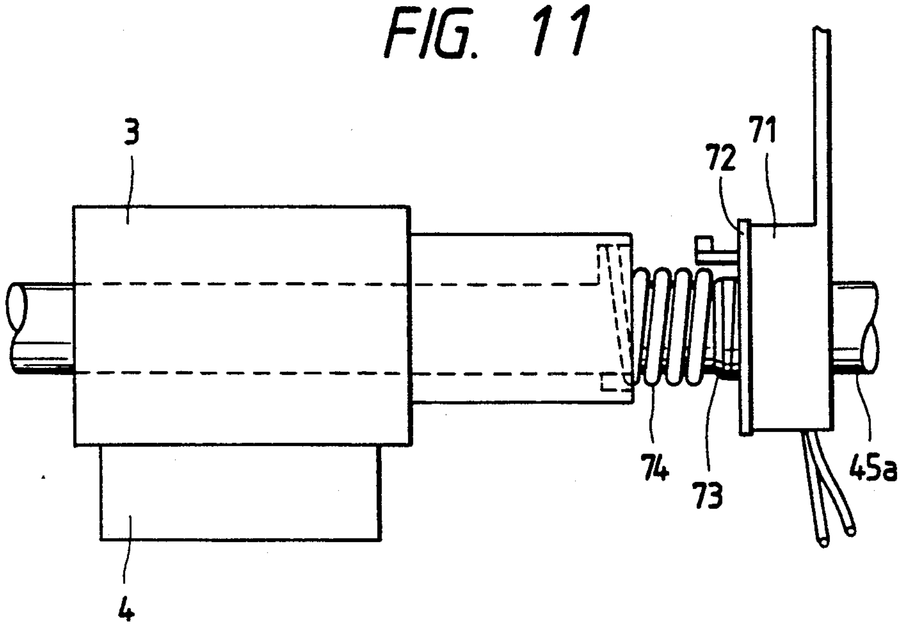
FIG. 11 a detailed view of an motor-operated clutch 80, a kind of clutch means, used in a printer according to the invention.

Referring now to FIG. 11, there is shown a detailed view of an electrically operated clutch 80 portion of the above clutch means.

The clutch 80 is disposed coaxially with the gear shaft 45*a*. In the clutch 80, when a clutch electromagnet is electrically energized, then the clutch electromagnet 71 attracts and fixes a clutch plate 72, which is stably pressed against the clutch electromagnet 71 by a compression spring 73, at an arbitrary position to thereby stop the clutch plate 72 in relative to an external member such as the frame 17*b* forming a mechanism. In this state, if the step motor 9 is operated, then a clutch spring 74 is going to rotate with the rotation of the gear shaft 45*a* but, because the clutch plate 72 in engagement with the loosening side of the clutch spring 74 is stopped with respect to the frame 17*b*, the clutch spring 74 starts to loosen from the side thereof facing the clutch plate 72 and thus the drive force of the gear shaft 45*a* is not transmitted to the record paper drive roller 3, so that the drive roller 3 remains stopped. On the other hand, when the clutch electromagnet is not energized electrically, then the clutch plate 72 is neither attracted nor fixed so as to be rotatable and, because the clutch spring 74 is disposed in tightening a grip on the gear shaft 45*a*, the clutch plate 72 engages with one end of the clutch spring 74 to rotate the drive roller 3, so that the drive power can be transmitted. The hold roller 4 is pressed against the drive roller 3 with a proper pressure to thereby hold the roll paper 11 therebetween.

The roll paper 11 is supplied from a roll paper supply part (not shown) disposed externally of the record paper passage, is passed inside the arm 25 supporting the platen and through the above-mentioned drive roller 3, is passed through the paper guide 21, and is finally discharged externally. The print head 1, which serves as one and the same printing part to execute both printing onto the cut sheet paper including the slip paper, validation paper and the like and printing onto the continuous paper including the roll paper and the like, includes therein wire pins 1*a*. According to the print head 1, the roll paper 11, slip paper 12, or validation paper 13 is set between the print head 1 and the printing platen 2 and printing is then executed by means of the ink ribbon 1*b*.

Next, description will be given below of the operation of the present embodiment.

(1) Printing on rolled sheet

When printing is executed on only the roll paper, the roll paper 11 is wound round the drive roller 3, is passed between the platen 2 and the print head, and is set at the printing position thereof. In the thus set state, similarly as in the above-mentioned slip printing, if the plunger 28 is electrically energized, then there is produced a printable state, that is, the clutch 80 can be connected with the step motor 9. In this state, if the power of the step motor 9 is converted to the rotational force of the drive roller 3 in a direction of an arrow 3A to thereby feed the roll paper 11, then printing can be executed on the roll paper 11 in synchronism with the driving timing of the print head 1, similarly as in the above-mentioned case. In this printing operation, the drive roller 5 and hold roller 6 are rotating but no problem arises because the slip paper 12 is not set.

In order to use the present printer as a receipt issuing machine, cutter means may be generally provided in the end portion (not shown) of the printer extending in a direction of an arrow 11A and the roll paper printed may be cut to a proper length.

Also, in order to use the present printer as a journal machine, winding means for winding the printed roll paper may be provided in the extended portion of the printer extending in the arrow 11A direction so that the printed paper can be recorded and kept.

(2) Printing on slip sheet

The printer is initialized in the following manner. As shown in FIG. 10, a slip sheet 12 is positioned by a form stopper (not shown) with the hold roller 8 opened; the plunger 18 is energized by a paper presence signal issued when the optical axis of the record paper detector 26 is shut-off; the motor 9 is then driven. As a result, the slip sheet 12 is held between the drive roller 7 and the hold roller 8, and is forwarded along the sheet guide 21 to a position where its head end is past the printing section, which is opened. The slip sheet 12 is then ready to be printed.

When the plunger 28 is electrically energized, then the printing part is closed and the platen 2 is set at a predetermined position to thereby provide a printable state as shown in FIG. 9. In this state, the clutch 80 is then disconnected so that the driving force of the step motor 9 is not transmitted to the drive roller 3. Thus, only the slip paper 12 is held and transferred by the drive roller 7, hold roller 8, drive roller 5, and hold roller 6 in the arrow 12A direction in synchronism with the driving timing of the print head 1, so that printing can be executed on the slip paper 12. In this operation, even if the roll paper 11 is set and it is a pressure sensitive paper, any understandable printing will never be found on the roll paper because the roll paper is not forwarded.

(3) Printing on validation sheet

The printer is initialized in the following manner, when printing on the validation sheet. The validation sheet is set with the hold roller 8 in a closed state, in contrast with the state shown in FIG. 10. If the optical axis of the record paper detector 26 is shut-off, then a sheet presence signal is generated. The validation sheet 13 is then ready to be printed.

Of the plunger 28 is electrically energized, then the printing part is closed and the platen 2 is set at a predetermined position to thereby provide a printable state as shown in FIG. 9. In this state, the clutch 80 is then disconnected so that the driving force of the step motor 9 is not transmitted to the drive roller 3. Thus, only the validation paper 13 is transferred by the drive roller 5 and hold roller 6 in the arrow 12A direction in synchronism with the driving timing of the print head 1, so that printing can be executed on the slip paper 12.

(4) Simultaneous printing on slip sheet and roll sheet

In a security slip printing case in which the same contents are printed simultaneously on the slip paper and on the roll paper, the roll paper is set as the pressure sensitive paper and the clutch 80 is set in the connected state similarly as in the above-mentioned journal machine. Then, the slip paper 12 is set and the slip paper 12 is printed over the rolled sheet 11 at the printing part. If printing is executed in this state, then the same printing contents can be printed simultaneously on the slip paper 12 by means of the ink ribbon and on the roll paper 11 by means of pressure of the wire pins 1*a*. Since the amount of feeding of the slip paper 12 is equal to that of the roll paper 11, no problem arises, for example, there is nor possibility of the two kinds of paper shifting from each other.

Figure 12:
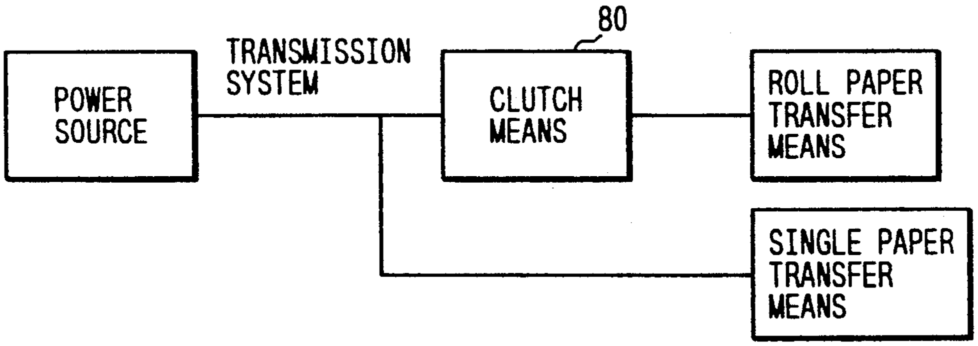
FIG. 12 is a block diagram of a record paper control system according to the invention; and, FIG. 13 is a block diagram of a record paper control system according to the prior art.
Figure 13:
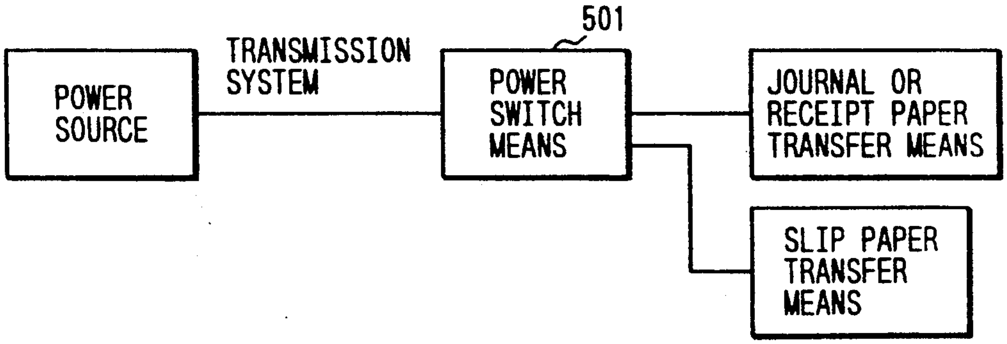

In FIG. 12, there is shown a block diagram of a record paper control system according to the present invention. In this figure, transfer means for transferring the slip sheet or validation sheet is always connected to a power source and is also connected by means of clutch means to the continuous paper such as roll paper, journal paper or the like. According to the invention, there is employed clutch means of an electrically operated type and, therefore, it is possible to automatically select one of the record paper transferring methods responsive to the operation of means which sets the kinds of printing.

Figure 2:
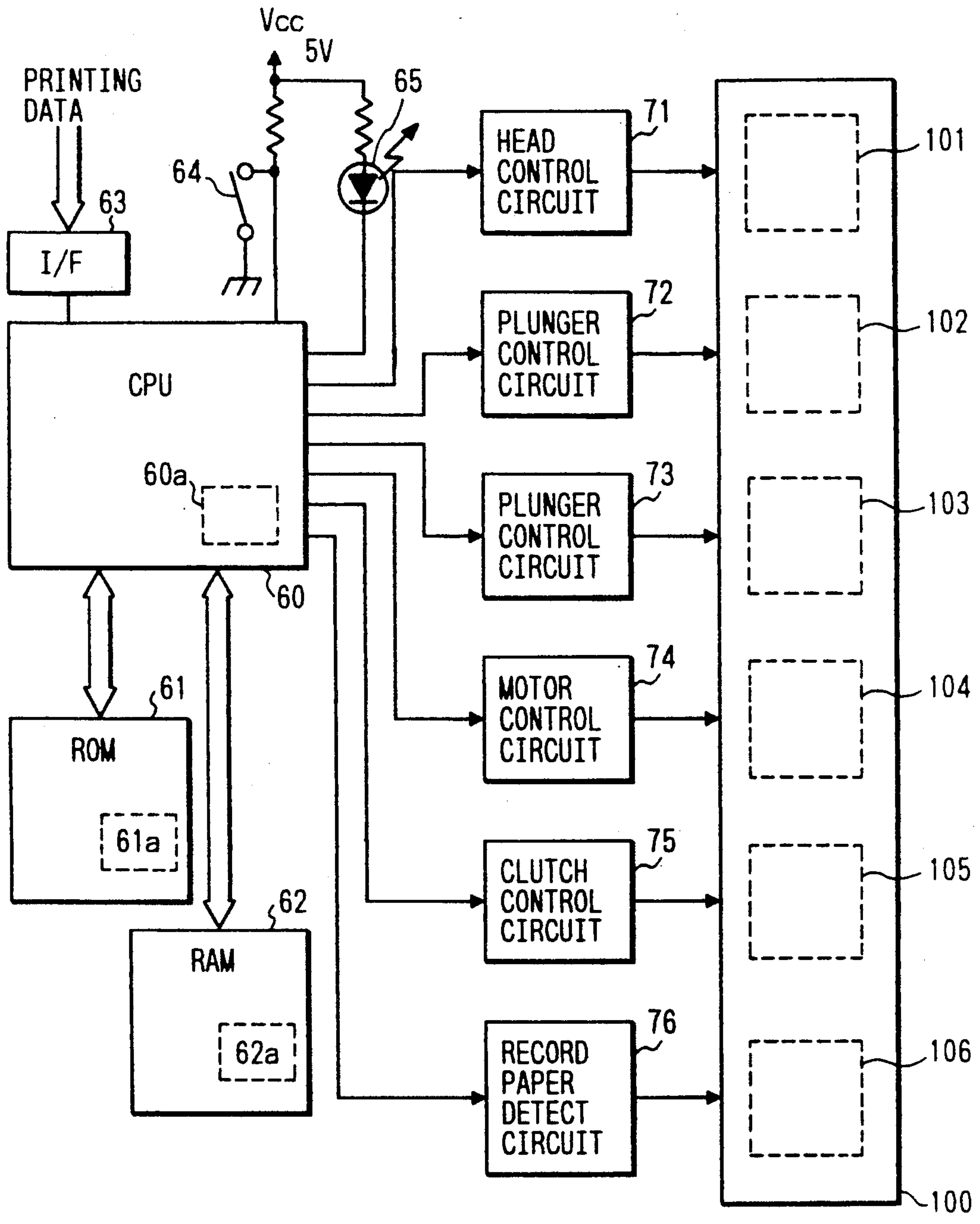
FIG. 2 is a circuit diagram of circuits used to realize the invention.

Referring now to FIG. 2, there is shown a block diagram of control circuits which are used to realize the present invention, in which reference numeral 100 designates the mechanism part of the printer previously described in connection with FIGS. 8, 9 and the like. The mechanism part 100 includes a print head 101, a combined mechanism 102 of printing part opening/closing mechanism and transfer part opening/closing mechanism, a combined mechanism 103 of transfer part opening/closing mechanism and passage shut-off mechanism 103, a step motor 104 which serves as a power source for transferring the record paper, a clutch 105, a record paper detector 106 and the like. In this figure, reference numeral 60 designates a central processing unit (CPU). The CPU 60 includes a ROM 61, a RAM 62, an interface 63, print mode select means 64, a light emitting diode 65 which is a kind of error display means, a head control circuit 71, a plunger control circuit 72, a plunger control circuit 73, a motor control circuit 74, a clutch control circuit 75, a detect circuit 76 connected to a record paper detector which is used to detect the presence or absence of the record paper, and the like. A switch 64 is as the print mode select means for selecting printing modes. In accordance with the states of the switch 64, it is decided whether printing should be executed on the slip paper or the validation paper.

Reference numeral 60*a* shown within the CPU 60 designates a built-in timer; 61*a*, a memory part for storing the number of steps of the step motor required for drawing out the leading end of the record paper from a form stopper position within the ROM 61; and 62*a*, a counter, a kind of counting means, for counting the number of drive steps of the step motor.

If print data is input from the interface 63, then the print data is taken into the RAM 62 once. Then, the CPU 60 decodes the print data, reads out from the ROM 61 the data of character font that corresponds to the data code, and controls the printer mechanism part by means of the motor control circuit, head control circuit and plunger control circuits, thereby executing the printing.

The printing mode can be selected by use of a panel switch which is drawn out from a circuit base plate to the case of the printer, or alternatively, by use of the data code that is input from the interface 63. Generally, in the POS printer connected to a host computer, it is convenient to select the record paper by use of the data code, that is, by use of commands.

Figure 1:
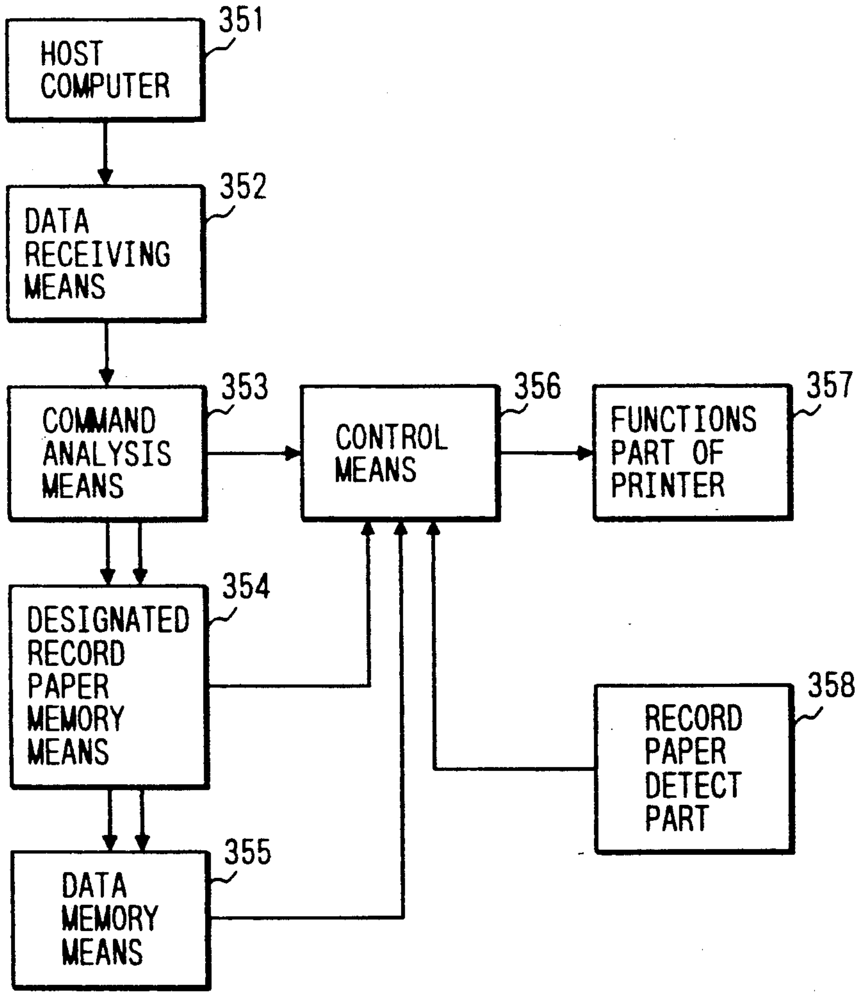
FIG. 1 is a functional block diagram of the whole structure of a printer according to the invention.

Referring now to FIG. 1, there is shown a functional block diagram of the whole structure of a printer according to the invention.

In FIG. 1, reference numeral 351 designates a host computer which sends commands, print data and the like to the printer; 352, data receiving means for receiving data codes from the host computer through the interface; and 353, command analysis means which analyses the data codes and discriminates the print data from the command code for setting various commands with respect to the printer. The analyzed data is stored in designated record paper memory means 354, data memory means 355 and the like.

Part of the command code is executed by control means to thereby control the functions part 357 of the printer. In accordance with the designation of the record paper, one of the above-mentioned kinds of record paper is selected and a transfer mechanism corresponding to the selected record paper is driven by the control means. Reference numeral 358 designates a record paper detect part which is used to detect the record paper. When the record paper detect part 358 transmits information on the record paper to the control means 356, then the control means 356 executes the optimum control that corresponds to the record paper detected.

Figures 3A, 3B:
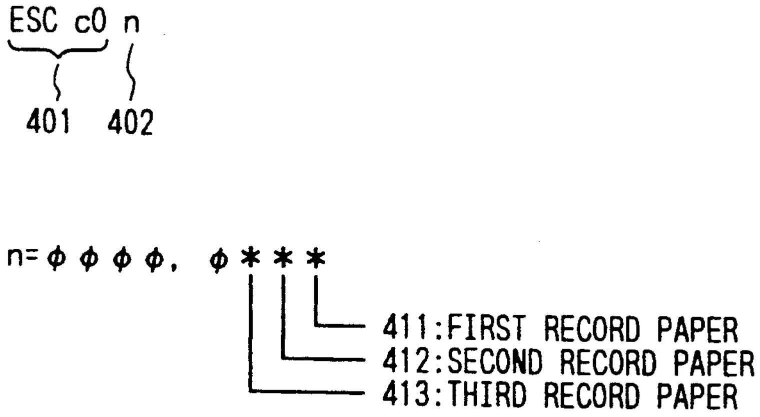
FIGS. 3A to 3B is an explanatory view of command analysis means according to the invention.

Now, in FIG. 3, there is shown an explanatory view of an embodiment of command analysis means according to the invention, illustrating an example of a command, which is included in the command codes, for designating the record paper. Specifically, FIG. 3A shows the code data that is transmitted from the host computer. Reference numeral 401 represents the code data which represent the record paper being designated, and 402 shows the content of the code data. FIG. 3B designates a data structure of 8 bits in which, for example, the lower 3 bits represent respectively the presence of the record paper designation, absence thereof, and removal of the designation, in the term of 1 or 0. The lower first bit represents the continuous paper, the lower second bit represents the slip paper, and the lower third bit represents the validation paper, respectively.

The continuous paper and one of the two kinds of the cut sheet paper can be designated at the same time and, as described above, the record paper transfer mechanism is controlled by the control means to thereby be able to realize the copying printing. In the illustrated embodiment, when the copying printing is necessary, the pressure sensitive paper is used as the continuous paper.

Figure 4:
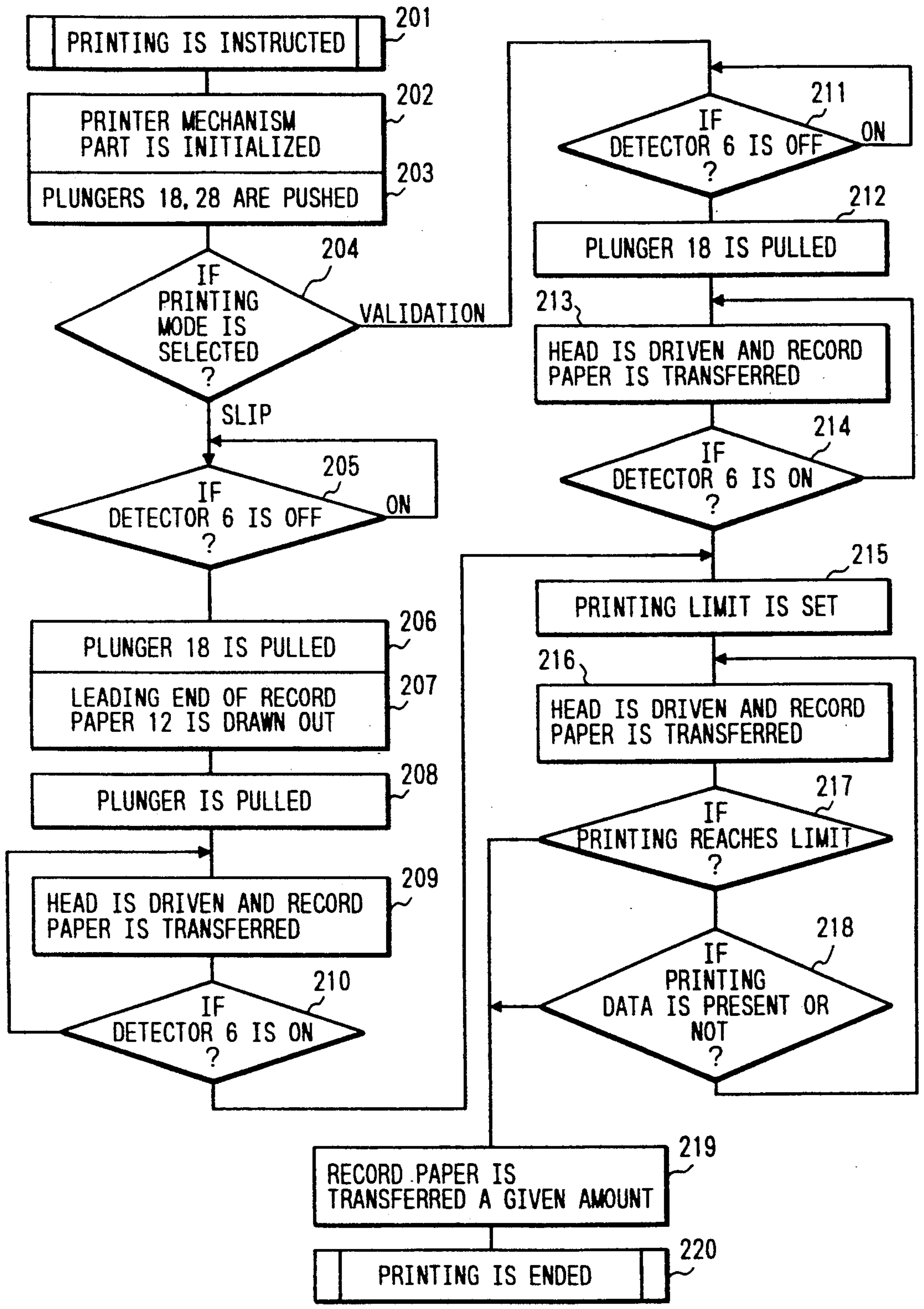
FIG. 4 is a flow chart of a method for controlling a printer according to the invention.

Referring now to FIG. 4, there is shown a flow chart of steps employed in an embodiment of a method for controlling a printer according to the invention, illustrating a printing controlling method when printing is executed on the cut sheet paper.

Upon receipt of a print command, the print data is written to the RAM 61 (Step 201). Then, the mechanism section of the printer is initialized (Step 202) and the plungers 18 and 28 are set in their extended (pushing) state, thereby both the printing part and the recording paper passage are opened (Step 203). The print mode, i.e., the recording sheet type, is selected (Step 204). For ordinary slip sheets, the print mode is set to a slip mode (Step 205), and for validation sheets, the print mode is set to a validation mode (Step 211).

In the slip mode, the level of the detector 26 is checked to confirm that the recording sheet has been set, and the printer waits until the detector 26 turns off. After the detector 26 has been turned off, the plunger 18 is set in a retracted (pulling) state and the foam stopper 27, which blocks the recording sheet forwarding path, is made ready to forward the recording sheet 12 (Step 206). The recording sheet 12 is forwarded to the printing part and the sheet head is aligned (Step 207). Then, the plunger 28 is set in its retracted (pulling) state to make the printer ready for printing by closing the printing section (Step 208). While driving the print head 1 and forwarding the recording sheet 12 (Step 209), the position at which the tail end of the recording sheet 12 passes through the detector 26 is monitored (Step 210). When the detector 26 has been turned on, a recording sheet forwarding amount up to the print limit is stored at a predetermined address in the RAM 62, and the recording sheet 12 is forwarded and the print head 1 is driven, both continuously, until the print data ends or the print limit is reached while decreasing the sheet forwarding amount in synchronism with the recording sheet forwarding operation (Steps 216, 217, and 218). After the recording sheet 12 has been forwarded by a predetermined amount (Step 219), the printing operation is brought to an end (Step 220).

In the validation mode, the recording sheet 13 is set (Step 211) and the plunger 18 is set in a retracted (pulling) state (Step 212), similarly as in the slip mode. Sheet head alignment is not necessary for validation sheets, and the recording sheet 13 must be forwarded only by an amount required by a recording sheet forwarding code included in the print data. The recording sheet 13 is forwarded and the print head 1 is driven, both continuously, until the detector 26 is turned on (Steps 213 and 214). The same operation as that in the slip mode then follows.

Figure 5:
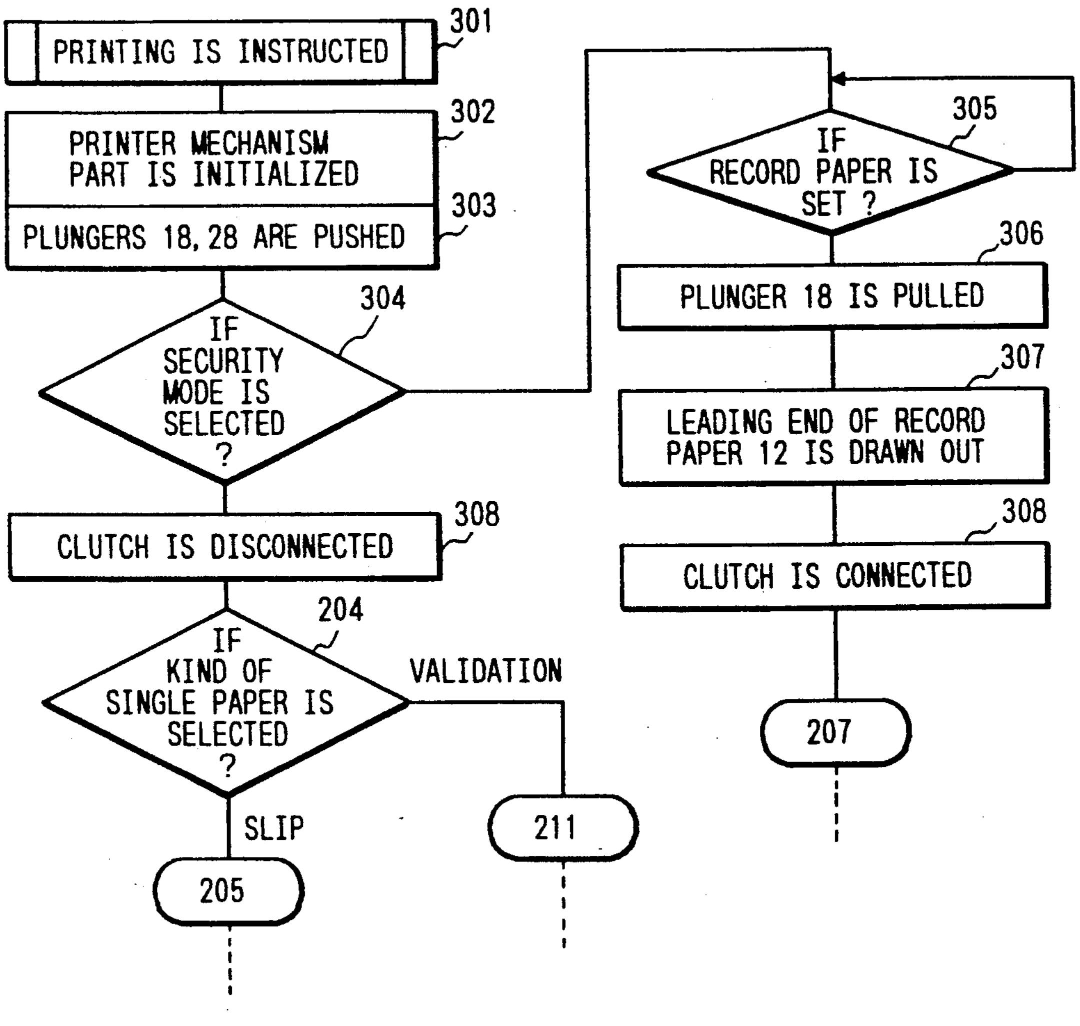
FIG. 5 is a flow chart of a method for controlling a printer according to the invention.

Referring now to FIG. 5, there is shown a flow chart of steps of a method for controlling a printer according to the invention, illustrating a method for controlling a security mode in which printing is executed on the roll paper, which is a kind of the continuous paper, and on the cut sheet paper.

Upon receipt of a print command, the print data is written to the RAM 61 (Step 301) Then, the mechanism section of the printer is initialized (Step 302) and the plungers 18 and 28 are set in their extended (pushing) state, thereby the recording paper passage are opened (Step 303). Then, it is checked whether the mode is a security mode or a cut sheet mode. (Step 304) When printing is executed on the cut sheet only, the clutch means is disconnected and the roll paper transfer mechanism is set in the disconnected state thereof. Then, the processing moves to Step 5 or Step 211 in FIG. 2, where the cut sheet printing is executed.

In the security mode, the processing advances to Step 305. After then, the plunger 18 is pulled (Step 306) and the leading end of the record paper 12 is drawn out (Step 307) After then, the clutch is connected (Step 308) and the printing is executed from Step 207 in the cut sheet printing routine shown in FIG. 4.

By means of such printing method, it is possible to accommodate every kind of printing form demanded in the POS market with a cut sheet printer.

Also, by connecting the clutch after the record paper 12 is set at the printing position, it is possible to save the amount of use of the roll paper used as the journal paper.

Figure 6:
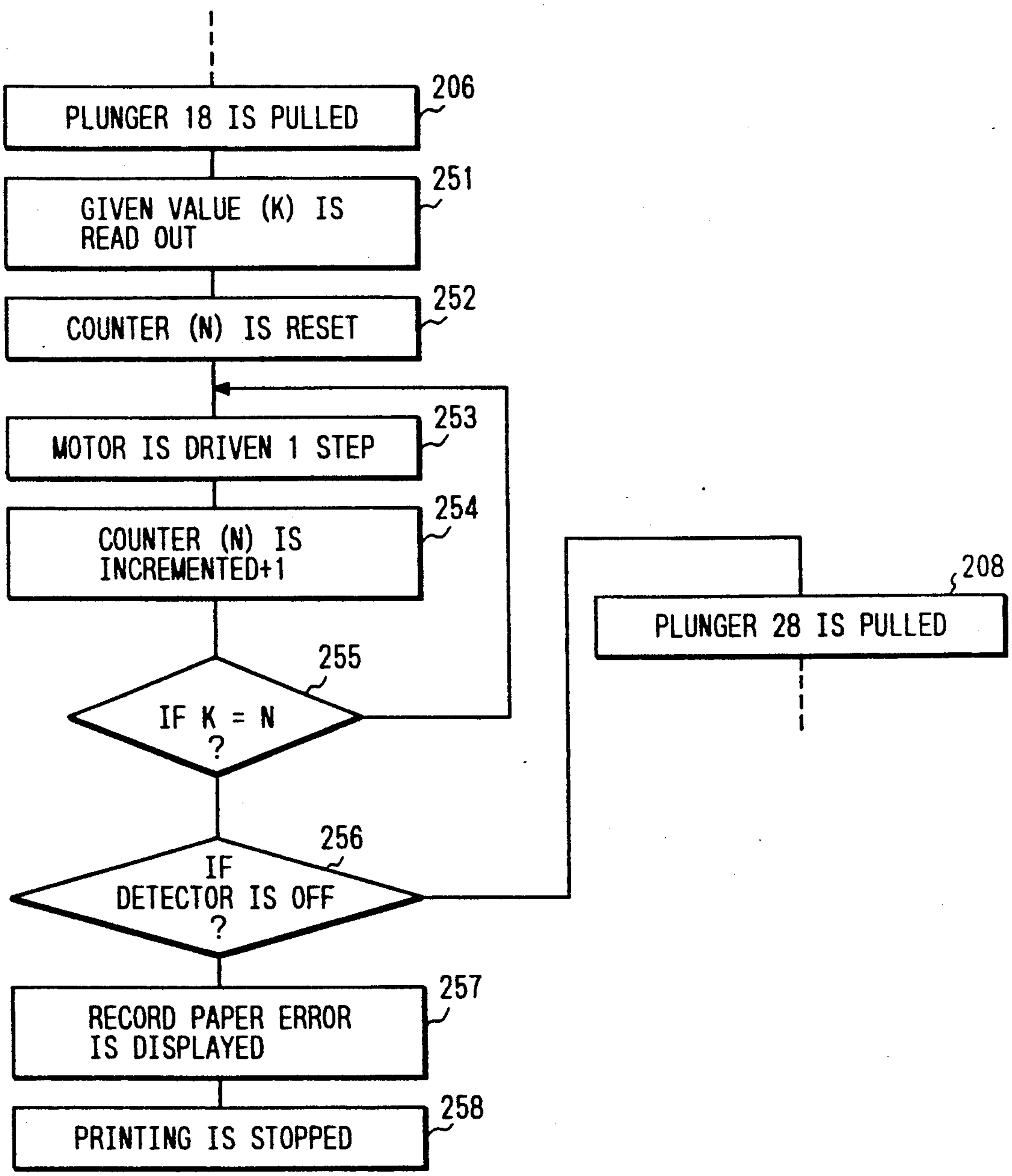
FIG. 6 is a flow chart of details of a processing for guiding the leading end of record paper according to the invention.

Finally, referring to FIG. 6, there is shown a flow chart of the details of Step 208, which processes the drawing out of the leading end of the record paper, in FIG. 4 and Step 307 in FIG. 5. A predetermined value K of the step motor stored in ROM 61 is read out (Step 251), data stored in RAM 62 is reset (Step 252), and the record paper is transferred while incrementing a counter N (Step 254), and these operations are executed repeatedly until K=N (Step 255). When K=N, then the processing advances to next step. The record paper detector 26 is used to confirm whether the record paper is set normally in the record paper passage. (Step 256) In this case, when the record paper has been detected, then the Step 208 and its following Steps in FIG. 4 are executed. However, if the validation paper is set in error, then the detector turns on because a relationship of $L_1 > L_2$ is obtained. This means that the kind of the record paper may be wrong, or that although the slip paper is selected, the slip paper may not be transferred correctly. For these reasons, the light emitting diode 65 is turned on to thereby alarm and display the error of the record paper (Step 257) and the printing is stopped. (Step 258)

As described above, by elaborating the record paper passage and by adding a process step for record paper detection by use of the elaborated record paper passage, it is possible to detect the incorrectly set record paper, the mis-section of the kind of the record paper and other inconveniences.

In the present embodiment, as an example, description has been given heretofore of a printer which incorporates a print head of a shuttle type. However, the invention is not limited to this, but an ordinary serial print head, which includes a print element consisting of 7 pins or 9 pins respectively arranged longitudinally, can be used to provide the same effects as in the above-mentioned print head.

As has been described hereinbefore, according to the present invention, three kinds of record paper passage systems are employed and a printing part can be used in common. Due to this structure, the invention can provide a printer which alone can cope with various kinds of record paper used in the POS market.

According to the invention, it is possible to construct a printer which is able to execute not only a slip mode for printing on slip paper of an irregular size but also a validation mode for printing on validation paper by use of a single print head, and also which can be made compact in space. That is, the invention can provide a printer of high utility value.

According to the structure of the invention, the record contents on the cut sheet paper can be left on the continuous paper as need arises and, therefore, the present printer can be used in a site which requires security such as keeping of the record contents and the like.

According to the structure of the printer mechanisms and control means of the invention, even if an operator is going to insert the slip paper in error in the validation mode, the record paper in error in the validation mode, the record paper shut-off mechanism detects such error insertion and prevents the slip paper from being printed. Also, when the slip mode is designated, if the validation paper is inserted in error, the trailing end of the record paper is detected before the leading end of the record paper is guided to the printing start position of the record paper, due to the structure of the record paper passages elaborately employed in the invention, that is, such mis-insertion can be detected as an error. This means that various kinds of record paper can be detected by a single detector and thus the present invention can provide a printer which is very useful in costs as well.

What is claimed is:

1. A printer capable of printing at least two types of record paper at a printing part thereof having a print head, comprising:

first record paper passages and first record paper transfer means for transferring a cut sheet of paper;

second record passages and second record paper transfer means for transferring continuous sheets of paper, said printer being capable of simultaneously printing on said at least two types of record paper wherein said first record paper transfer means is different from said second record paper transfer means;

a printing opening/closing mechanism for changing a distance between the print head and a platen;

a forwarding opening/closing mechanism for preparing the cut sheet to be transferred by said first record paper transfer means;

a step motor serving as a common drive source for said first and second record paper transfer means;

clutch means interposed between said second record paper transfer mechanism and said step motor and electrically operable;

count means for counting drive step number of said step motor;

memory means for storing a predetermined number of steps from a top end position of said record paper to a predetermined position in said printing part;

an interface for transmitting and receiving data codes for information of said printer including a control command, printing data to and from a host computer;

data receiving means for receiving said data codes of said host computer;

command analysis means for interpreting said control command of said host computer;

memory means for storing designation of said each record paper type recognized by said command analysis means; and control means for controlling said transfer means according to said stored designation of said record paper.

2. A printer as claimed in claim 1, wherein when said record paper designation represents a plurality type of sheets of record paper, said first and second record paper transfer means are operated simultaneously to transfer said plurality of type of sheets of record paper.

3. A printer as claimed in claim 1, further comprising third record paper passage and third record paper transfer means for transferring another cut sheet of paper in addition to said cut sheet of paper.

4. A method for controlling a printer capable of printing at least two types of record paper at a printing part thereof having a print head, said printer comprising: first record paper passages and first record paper transfer means for transferring a cut sheet of paper; second record paper passages and second record paper transfer means for transferring continuous sheets of paper; an interface for transmitting and receiving data codes for information of said printer including a control command, printing data to and from a host computer; data receiving means for receiving said data codes of said host computer; command analysis means for interpreting said control command of said host computer; memory means for storing designation of said record paper type recognized by said command analysis means; and control means for controlling said transfer means according to said stored designation of said record paper; a step motor serving as a command drive source for said first and second record paper transfer means; clutch means interposed between said second record paper transfer mechanism and said step motor and operable by an electric motor; count means for counting the drive step number of said step motor; and memory means for storing a given number of steps from the cut-off position of said record paper to a given position in said printing part, said method, when said plurality of sheets of record paper are designated, said controlling method comprising the steps of:

setting said clutch means in a non-connected state;

detecting that said first record paper is set at a given position;

transferring said first record paper to a given printing start position after detection of said first record paper;

connecting said clutch means after completion of said transferring step; and, executing a given printing after said clutch means is connected.

* * * * *